United States Patent
Moore

[11] Patent Number: 5,884,135
[45] Date of Patent: Mar. 16, 1999

[54] LIMITED ROTATION SLIP CLUTCH

[75] Inventor: Kenneth P. Moore, Rochester, N.Y.

[73] Assignee: Xerox Corporation, Stamford, Conn.

[21] Appl. No.: 976,272

[22] Filed: Nov. 21, 1997

[51] Int. Cl.$^6$ .................................................. G03G 15/00
[52] U.S. Cl. ........................................ 399/361; 271/10.13
[58] Field of Search .................................. 399/361, 381,
399/396, 397, 405, 407; 271/10.05, 10.13

[56] References Cited

U.S. PATENT DOCUMENTS

| | | | |
|---|---|---|---|
| 3,564,960 | 2/1971 | Foulks ........................................ | 83/203 |
| 4,427,287 | 1/1984 | Matsumoto et al. . | |
| 4,579,444 | 4/1986 | Pinckney et al. . | |
| 4,785,325 | 11/1988 | Kramer et al. . | |
| 4,892,426 | 1/1990 | Steele ........................................ | 400/708 |
| 5,169,136 | 12/1992 | Yamagata et al. .................... | 271/10.13 |
| 5,253,856 | 10/1993 | Fuchi et al. . | |
| 5,339,139 | 8/1994 | Fullerton et al. . | |
| 5,423,527 | 6/1995 | Tranquilla . | |
| 5,461,468 | 10/1995 | Dempsey et al. . | |
| 5,579,129 | 11/1996 | Iwata et al. . | |
| 5,678,815 | 10/1997 | Sheng ..................................... | 271/10.13 |
| 5,689,795 | 11/1997 | Mastrandrea ........................... | 399/407 |

*Primary Examiner*—Sandra Brase
*Attorney, Agent, or Firm*—John S. Wagley

[57] ABSTRACT

A coupling for mechanically interconnecting a rotating mechanism to a media advancing surface, for advancing media in a printing apparatus is disclosed. The coupling includes a first member having a first member feature and a second member rotatably cooperating with the first member. The second member has a second member feature. The first member feature and the second member feature cooperate to provide limited rotational motion of the first member relative to the second member.

20 Claims, 8 Drawing Sheets

LIMITED ROTATION SLIP CLUTCH

This invention relates to electrostatographic printing machines, and, more particularly, to an electrostatographic printing system having a finishing station.

Generally, the process of electrostatographic reproduction is executed by exposing a light image of an original document to a substantially uniform charged photoreceptive member. Exposing the charged photoreceptive member to a light image discharges the photoconductive surface thereof in areas corresponding to non-image areas in the original document while maintaining the charge on the image areas to create an electrostatic latent image of the original document on the photoconductive surface of the photoreceptive member. The latent image is subsequently developed into a visible image by depositing a charged developing material onto the photoconductive surface so that the developing material is attracted to the charged image areas thereon. The developing material is then transferred from the photoreceptive member to an output copy sheet on which the image may be permanently affixed in order to provide a reproduction of the original document. In a final step in the process, the photoreceptive member is cleaned to remove any residual developing material on the photoconductive surface thereof in preparation for successive imaging cycles.

The electrostatographic copying process described above is well known and is commonly used for light lens copying of an original document. Analogous processes also exist in other electrostatographic printing applications such as, for example, ionographic printing and reproduction, where charge is deposited on a charge retentive surface in response to electronically generated or stored images.

Early simple electrostatographic printers and copy machines were slow and produced only a few copies per minute. These small, simple machines utilized a common drive motor with various shafts and pulleys mechanically interconnected by gears and timing belts. Feeding substrates such as paper through such machines was relatively simple.

Modern, high speed copying and printing machines, however, often include a plurality of drive motors. Each of these drive motors drive a portion of the copy or printing machine. These portions of the printing machine often are in the form of modules. These modules may be added together to provide variance of a printing machine. For example, the printing machine may include a xerographic module in which the electrostatographic process is conducted, a paper handling section in which paper is fed to and from the machine as well as a finishing section in which sheets are combined into sets or prepared with a subsequent operation such as stapling or binding. Further, printing machines may include an additional paper storage module such as in the form of an interposer in which sheets may be sent to the xerographic processor and/or directly to the finisher of a printing machine. Each of these modules, in order to maintain their modularity, include a separate drive motor. Attempts have been made to maintain, as close as is physically possible, identical speeds for the separate drive motors in each of the modules. DC (direct current) electrical motors which may include a rotary encoder provide the most accurate motor speed that is currently commercially feasible. These DC motors with rotary encoders and associated control systems have a speed accuracy of approximately + or −0.3 percent.

By designing subsequent modules with sequentially faster paper feed velocities, the inaccuracy of + or −0.3 percent speed variations between consecutive modules may be accomplished by allowing minimum slip of the sheets of substrate as they transfer from a first module to a second module. It should be appreciated that such sheet slip has a practical limit which requires the superior accuracy of a DC motor with a rotary encoder. This is particularly true for machines having a throughput of 100 to 200 ppm (prints per minute) (100 ppm=1010 mm/sec and 240 ppm=2247 mm/sec). At a pitch of about 9½ inches, the speed of 200 ppm equates to a process speed of 1900 inches per minute or 32 inches per second. Attempts have been made to provide designs to copying and printing machines that eliminate the need of the very expensive DC motors with rotary encoders. A less expensive commercially available motor is in the form of an AC non-synchronous motor or a synchronous AC motor. Such motors have a speed accuracy of, for example, approximately + or − two to five percent.

The use of AC non-synchronous motors requires the ability to accommodate the additional error in speeds between adjacent modules. One way of accomplishing this variation in speed is to permit the sheet entering the module to be driven at a speed in excess of the driven speed of the module which it is exiting. One way to accomplish this overdriving of the substrate is to provide a one-way clutch in the form of a needle bearing overdriving clutch.

Referring now to FIG. 4, a prior art feed clutch is shown. The driving mechanism 1 includes an, output module driving means (not shown) and a clutch 2 preferably in the form of an overrunning or one way clutch. For example, the clutch 2 includes an internal driver 3 rotating in the direction of arrow 4 by the driving means surrounded by a driven ring 5. Rollers 6 separate internal driver 3 from ring 5 so that the driving mechanism 1 is rotated in direction of arrow 4 by the driving means to drive the sheet 7 at velocity $V_1$. When, however, input module mechanism 8 drives sheet 7 at a velocity greater than $V_1$, the driven ring 5 rotates faster in direction of arrow 4 permitting driven ring 5 to rotate freely in direction of arrow 4. One way clutch 2 may be any suitable clutch, i.e. such a clutch is manufactured by INA Bearing Co., Inc., Fort Mill, S.C.

The aforementioned one-way needle bearing clutches are expensive and unreliable. The clutch requires a very tight tolerance of the clutch to the shaft and between the clutch and the pulley bore. Also, the shaft and pulley bore both require a very tight tolerance of surface finish of the mating surfaces to the needle bearings. Further, the shaft on which the needle bearings rotate requires a hardness to prevent premature wear. Furthermore, contamination within the clutch both during machining and during operation and in operation and handling will render the clutch ineffective. Furthermore, the materials and tolerances required to produce an operational clutch necessitates that the clutch be inherently expensive.

The following disclosures appear to be relevant:

U.S. Pat. No. 5,461,468 Patentee: Dempsey et al. Issued: Oct. 24, 1995

U.S. Pat. No. 5,423,527 Patentee: Tranquilla Issued: Jun. 13, 1995

U.S. Pat. No. 5,339,139 Patentee: Fullerton et al. Issued: Aug. 16, 1994

U.S. Pat. No. 4,892,426 Patentee: Steele Issued: Jan. 9, 1990

U.S. Pat. No. 4,785,325 Patentee: Kramer et al. Issued: Nov. 15, 1988

U.S. Pat. No. 4,579,444 Patentee: Pinckney et al. Issued: Apr. 1, 1986

U.S. Pat. No. 4,427,287 Patentee: Matsumoto et al. Issued: Jan. 24, 1984

U.S. Pat. No. 3,564,960 Patentee: Foulks Issued: Feb. 23, 1971

The relevant portions of the foregoing disclosures may be briefly summarized as follows:

U.S. Pat. No. 5,461,468 discloses a document handler interdocument gap control system. A first servo drive feeds document in a first path portion and a second servo drive feeds documents in the second path portion. A sheet edge sensor in the first path portion signal the passage of the lead or trail edge of document sheets.

U.S. Pat. No. 5,423,527 discloses a method of processing documents by moving them from an input hopper to a destination site at a controlled rate. The method includes driving each document into a feed path from the input hopper at an adjustable time period after a previous document has been feed, then sensing the distance separating the documents and adjusting the time period between driving of succeeding documents to achieve a desired gap.

U.S. Pat. No. 4,892,426 discloses a paper movement monitor for monitoring the movement of paper through a printer. The monitor includes sensors in the form of photo-optical wheels which are in rolling contact with the paper and sense the position of the paper.

U.S. Pat. No. 4,785,325 discloses a document imaging system including a mechanism for adjusting the speed ratio between the document scanning system and the photoreceptor. A timing belt is connected between an adjustable tapered portion of a drive pulley mounted on the photoreceptor drive shaft and the document scanning system. The portion of the tapered surface on which the belt is driven is axially adjustable resulting in a change in scanning speed.

U.S. Pat. No. 4,579,444 discloses a document registration system for use in a document feeder of a copier. The registration system includes a control system for controlling document platen transport to stop at a desired calculated position. The system includes a sensor and upstream of the trailing edge of a document. The sensor provides a signal indicative of the size of the copy sheet and calculates a stopping position on the platen based on the selected copy reduction size.

U.S. Pat. No. 4,427,287 discloses a copying machine having an automatic document feeder. The copy machine has a single motor for driving a drive mechanism for the main body and a drive mechanism for the automatic document feeder. A timing disk is coupled to the motor for supplying a timing signal. Based on this signal, a CPU controls the operation of the copy machine.

U.S. Pat. No. 3,564,960 discloses a copy machine copy paper length error compensating system. As an original moves forward, a trailing edge sensor sends an initial cutting signal to a super-precise electronic timer having a capacitor. The charging interval of the capacitor is controlled to maintain cut length of the sheet.

As will be seen from an examination of the cited prior art, it is desirable to provide an electrostatographic copying system with a maximum throughput at the finishing station. The transition from a first set of sheets to be finished or a second or subsequent set of sheets to be finished results in a lower productivity to account for handling required for the various sets of sheets. This invention is directed to reduce the lost productivity between adjacent sets of sheets and thereby to improve the throughput out the finishing station and the effective capacity of the printing machine.

In accordance with one aspect of the invention, there is provided a coupling for mechanically interconnecting a rotating mechanism to a media advancing surface, for advancing media in a printing apparatus. The coupling includes a first member having a first member feature and a second member rotatably cooperating with the first member. The second member has a second member feature. The first member feature and the second member feature cooperate to provide limited rotational motion of the first member relative to the second member.

In accordance with another aspect of the present invention, there is provided a printing apparatus including a coupling for mechanically interconnecting a rotating mechanism to a media advancing surface, for advancing media. The coupling includes a first member having a first member feature and a second member rotatably cooperating with the first member. The second member has a second member feature. The first member feature and the second member feature cooperate to provide limited rotational motion of the first member relative to the second member.

In accordance with yet another aspect of the present invention, there is provided a method for accelerating a sheet in a sheet feeding mechanism in a printing machine from a first translational velocity to a second translational velocity. The method comprising the steps of operably connecting the sheet to a first feed mechanism, feeding the sheet at the first translational velocity with the first feed mechanism, providing a feed roll driven by a second mechanism, advancing a leading edge of the sheet into a nip at the second translational velocity, the nip defined a pair of rolls, at least one of the rolls being the feed roll, releasing the sheet from the first feed mechanism, accelerating the sheet from the first translational velocity to the second translational velocity, and releasing the sheet from the nip.

For a general understanding of the present invention, as well as other aspects thereof, reference is made to the following description and drawings, in which like reference numerals are used to refer to like elements, and wherein.

While the present invention will be described with a reference to preferred embodiments thereof, it will be understood that the invention is not to be limited to these preferred embodiments. On the contrary, it is intended that the present invention cover all alternatives, modifications, and equivalents as may be included within the spirit and scope of the invention as defined by the appended claims. Other aspects and features of the present invention will become apparent as the description proceeds.

Figure 1:
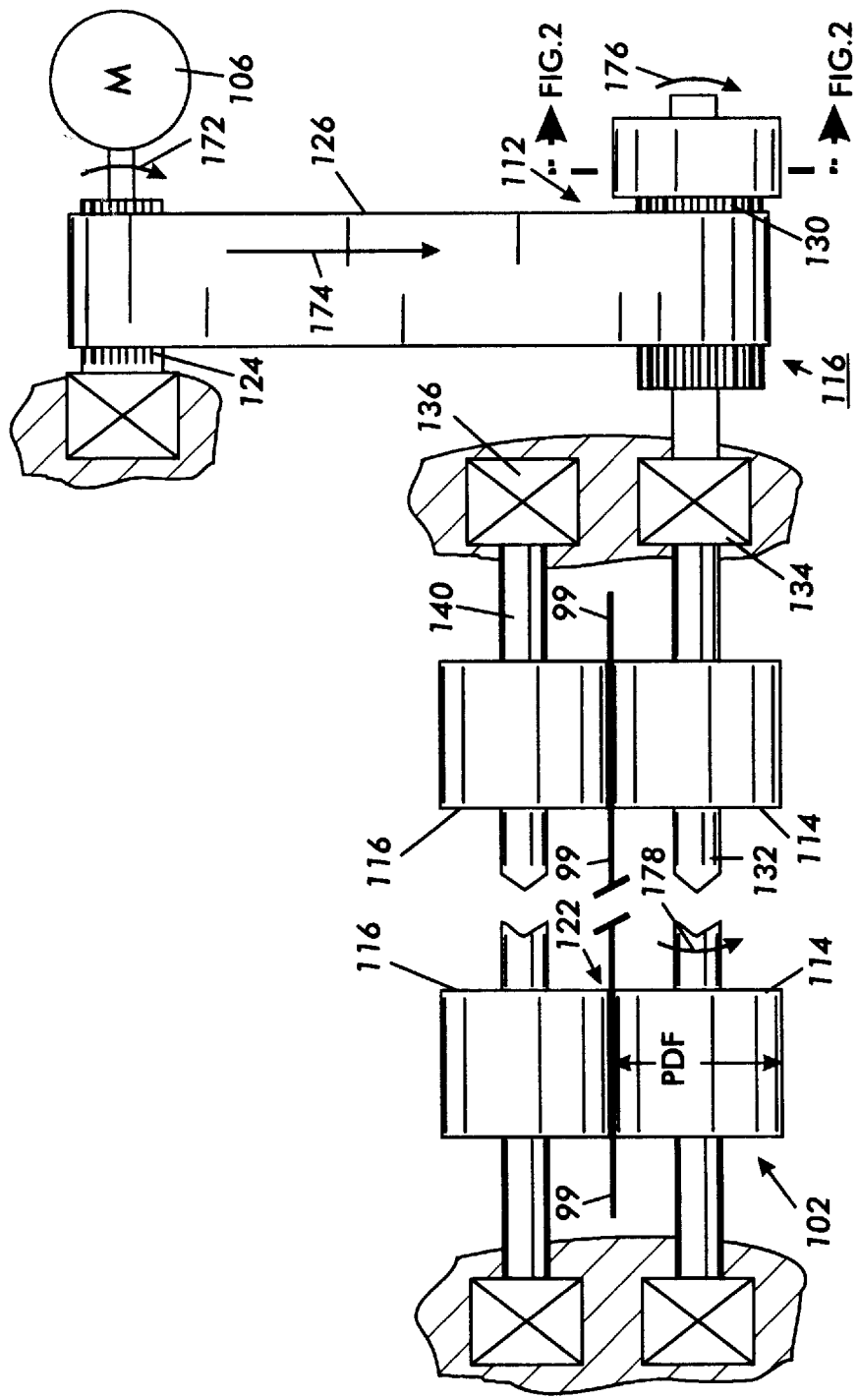
FIG. 1 is plan view of a feed roll assembly using the limited rotation slip clutch according to the present invention.

Inasmuch as the art of electrostatographic processing is well known, the various processing stations employed in a typical electrostatographic copying or printing machine of the present invention will initially be described briefly with reference to FIG. 1. It will become apparent from the following discussion that the paper feeding system of the present invention is equally well suited for use in a wide variety of other electrophotographic or electronic printing systems, as for example, ink jet, ionographic, laser based exposure systems, etc.

Figure 5:
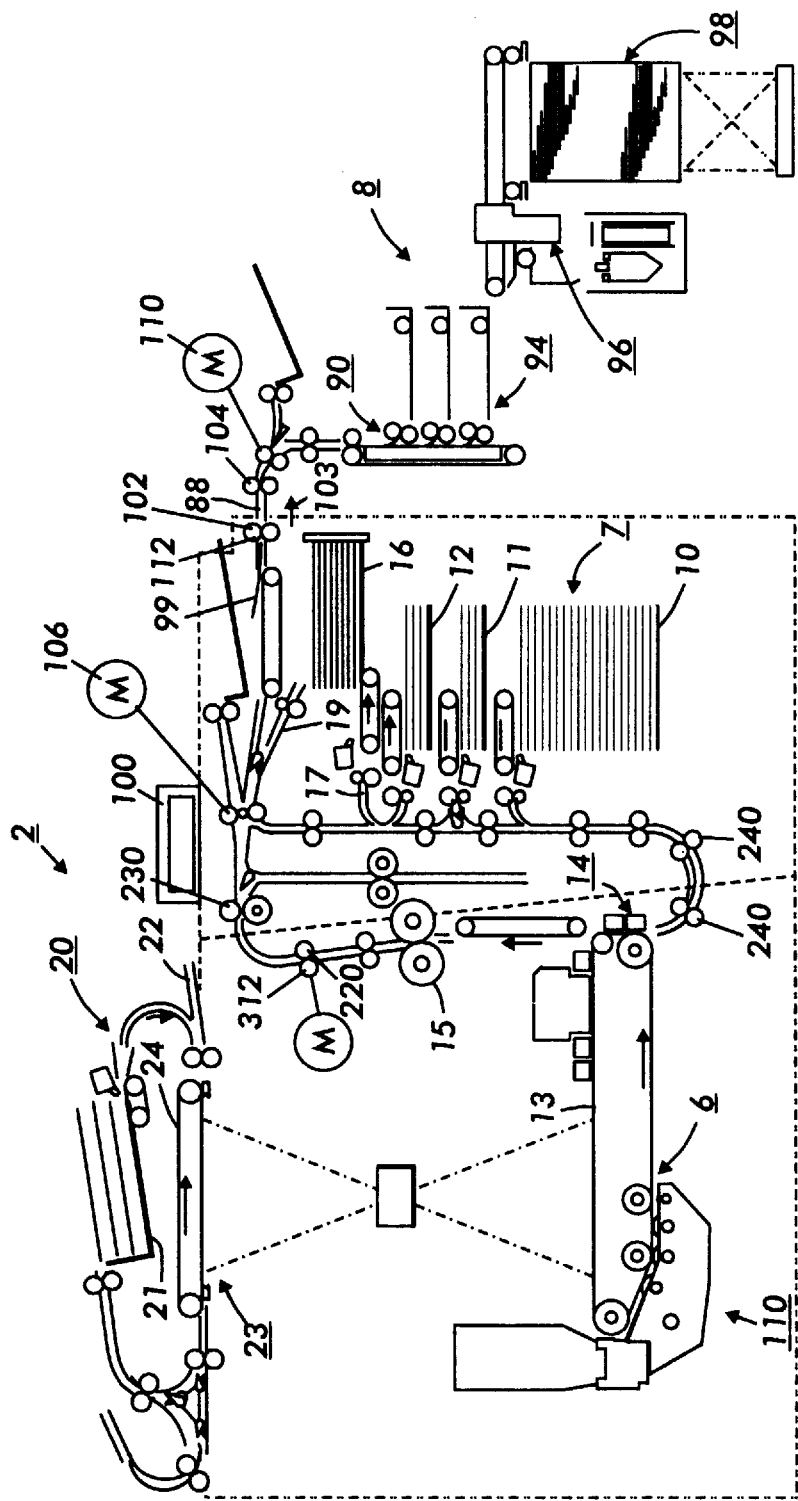
FIG. 5 is a schematic elevational view of a printing machine incorporating the limited rotation slip clutch of FIG. 1.

In FIG. 5, there is shown, in schematic form, an exemplary electrophotographic copying system 2 for processing, printing and finishing print jobs in accordance with the teachings of the present invention. For purposes of explanation, the copying system 2 is divided into a xerographic processing or printing section 6, a sheet feeding section 7, and a finishing section 8. The exemplary electrophotographic copying system 2 of FIG. 6 incorporates a recirculating document handler (RDH) 20 of a generally known type, which may be found, for example, in the well known Xerox Corporation model "1075", "5090" or "5100" duplicators. Such electrostatographic printing systems are illustrated and described in detail in various patents cited above and otherwise, including U.S. Pat. No. 4,961,092, the principal operation of which may also be disclosed in various other xerographic or other printing machines.

A printing system of the type shown herein is preferably adapted to provide, in a known manner, duplex or simplex collated print sets from either duplex or simplex original documents circulated by a document handler. As is conventionally practiced, the entire document handler unit 20 may be pivotally mounted to the copier so as to be liftable by an operator for alternative manual document placement and copying. In this manner, the exemplary printing system or apparatus 2 is designed to receive input documents as manually positioned on an optically transparent platen or automatically positioned thereon via a document handler, such as a recirculating document handler (RDH) 20, via a document handler input tray 21 or a document feeder 22.

The RDH 20 operates to automatically transport individual registered and spaced document sheets into an imaging station 23, platen operatively associated with the xerographic processing section 6. A platen transport system 24 is also provided, which may be incrementally driven via a non-slip or vacuum belt system controlled by a system controller 100 for stopping the document at a desired registration (copying) position in a manner taught by various references known in the art.

The entire stack of originals in the RDH tray 21 can be recirculated and copied to produce a plurality of collated copy sets. In addition, the document set or stack may be recirculated through the RDH any number of times in order to produce any desired number of collated duplex print sets, that is, collated sets of duplex copy sheets, in accordance with various instruction sets known as print jobs which can be programmed into a controller 100, to operator which will be described.

Since the copy or print operation and apparatus of the present invention is well known and taught in numerous patents and other published art, the system will not be described in detail herein. Briefly, blank or preprinted copy sheets are conventionally provided by sheet feeder section 7, whereby sheets are delivered from a high capacity feeder tray 10 or from auxiliary paper trays 11 or 12 for receiving a copier document image from photoreceptor 13 at transfer station 14. In addition, copy sheets can be stored and delivered to the xerographic processing section 6 via auxiliary paper trays 11 or 12 which may be provided in an independent or stand alone device coupled to the electrophotographic printing system 2. After a developed image is transferred to a copy sheet, an output copy sheet is delivered to a fuser 15, and further transported to finishing section 8 (if they are to be simplex copies), or, temporarily delivered to and stacked in a duplex buffer tray 16 if they are to be duplexed, for subsequent return (inverted) via path 17 for receiving a second side developed image in the same manner as the first side. This duplex tray 16 has a finite predetermined sheet capacity, depending on the particular copier design. The completed duplex copy is preferably transported to finishing section 8 via output path 88. An optionally operated copy path sheet inverter 19 is also provided.

Output path 88 is directly connected in a conventional manner to a bin sorter 90 as is generally known and as is disclosed in commonly assigned U.S. Pat. No. 3,467,371 incorporated in its entirety by reference herein. Bin sorter 90 includes a vertical bin array 94 which is conventionally gated (not shown) to deflect a selected sheet into a selected bin as the sheet is transported past the bin entrance. An optional gated overflow top stacking or purge tray may also be provided for each bin set. The vertical bin array 94 may also be bypassed by actuation of a gate for directing sheets serially onward to a subsequent finishing station. The resulting sets of prints are then discharged to finisher 96 which may include a stitcher mechanism for stapling print sets together and/or a thermal binder system for adhesively binding the print sets into books. A stacker 98 is also provided for receiving and delivering final print sets to an operator or to an external third party device.

Referring again to FIG. 5, sheet 99 is shown advancing along output path 99 from print module 7 to finishing module 8. The sheet 99 is advanced in the direction of arrow 103 from first output paper feed assembly 102 located within the printing module 7 to first input paper feed assembly 104 located within the finishing module 8. The output paper feed assembly 102 is mechanically connected to print module motor 106 while first output paper feed assembly is mechanically connected to finishing module motor 110.

For efficiently and smoothly feeding the sheet 99 from output paper feed assembly 102 to input paper feed assembly 104, preferably, the print module motor 106 and the finishing module motor 110 have identical speeds. In reality, however, the speeds of motors 106 and 110 are slightly different from each other. The amount that the motors 106 and 110 differ in speed depends on the accuracy of the motors chosen for this machine.

The motors 106 and 110 may be any suitable durable motor capable of accuracy maintaining a given motor speed. Preferably, the motors 106 and 110 have an accurate speed control. For example, the motors 106 and 110 may be DC (direct current) motors which include encoders for determining the rotational position of the armatures within the motors. One such type of encoder is a holofax relay. Such DC motors with holofax relay encoders have a speed accuracy of approximately + or −0.3 percent. It should be appreciated that the control system also has an impact on accuracy. This level of speed accuracy permits the direct mechanical connection of adjacent modules. The use of DC motors with encoders adds greatly to the expense of the machine in that the DC drive motors and rotary encoders are very expensive and in that a control system which is also expensive is further required to operate the system.

The use of AC (alternating current) drive motors results in a speed accuracy of 3.0 to 5.0 percent. An error between adjacent modules of five percent in the speed of the sheet would not permit reliable feeding between the module boundaries. When utilizing non-synchronous AC motors, the five percent error between feed rates necessitates the use of an overdriving clutch.

Referring now to FIG. 1, an overdriving clutch according to the present invention is shown within print module output paper feed assembly 102. The clutch 112 may be positioned anywhere within print module output drive train 116 between motor 106 and paper feed rolls 114. The print module output paper feed rolls are in rolling contact with print module output backup rolls 116. The paper feed rolls 114 and the backup rolls 116 form a paper nip 122 therebetween. The sheet 99 (see FIG. 5) advances by being fed through paper nip 122 (see FIG. 1).

The drive train 116 may consist of any of a number of mechanical components capable of transferring motion from the motor 106 through the clutch 112 to the paper feed rolls 114. For example, as shown in FIG. 1, the motor 106 is connected to input timing sprocket 124. A timing belt 126 interconnects the input timing sprocket 124 to output timing sprocket 130. Clutch 112 as shown in FIG. 1 may be located within output timing sprocket 130. The clutch 112 may be connected to shaft 132. The shaft 132 may be supported in any suitable fashion, e.g., by bearings 134. The paper feed rolls 114 may be connected to shaft 132. While a single paper feed roll 114 may be sufficient, a plurality of spaced apart paper feed rolls 114 are preferably positioned along shaft 132.

The backup rolls 116 are supported by bearings 136 which are connected to the backup rolls 116 by shaft 140. The backup rolls 116 are preferably aligned with the paper feed rolls 114 forming the paper nip 122 therebetween. The paper feed rolls have a diameter PDF of, for example, one inch.

As shown in FIG. 1, preferably, the clutch 112 is positioned away from paper nip 122 such that the diameter of the clutch 112 may be adjusted without affecting the positioning of the paper nip 122.

Figure 2:
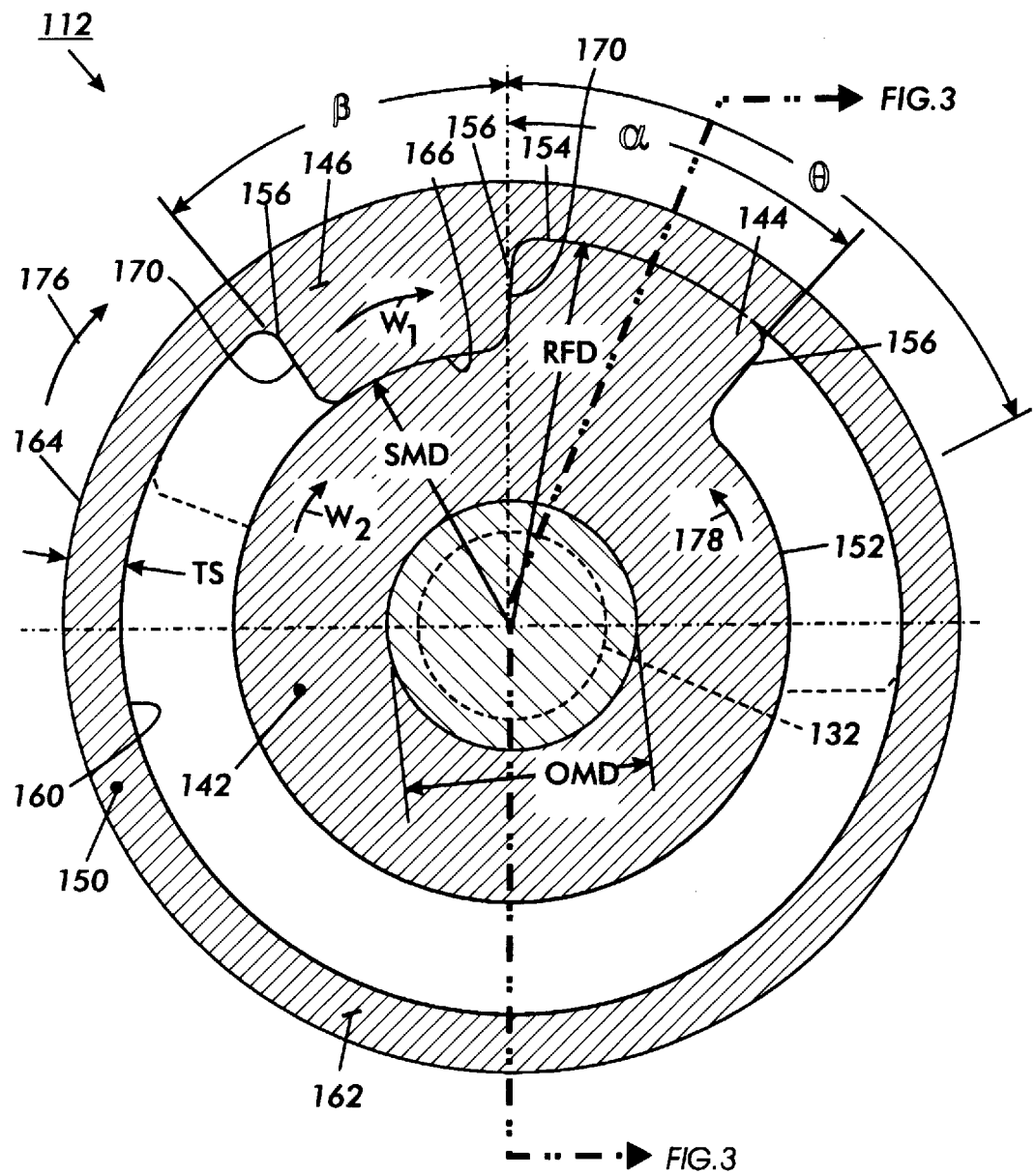
FIG. 2 is a sectional view of the limited rotation slip clutch of FIG. 1 along the line 2—2 in the direction of the arrows showing in the clutch in greater detail.

Referring now to FIG. 2, the clutch 112 is shown in greater detail. The clutch 112 includes a first member 142 which is operably connected to an output member. For example, as shown in FIGS. 1 and 2, the output member may be in the form of a shaft 132. The first member 142 includes a first member feature 144 which cooperates with a second member feature 146 of second member 150. The first member feature 144 of the first member 142 cooperates with the second member feature 146 of the second member 150 to permit either the first member 142 or the second member 150 to drive the other of the members. The first member feature 144 and the second member feature 146 are removably contactable with each other such that relative motion can occur between the first member feature 144 and the second member feature 146. The relative motion between the first member feature 144 and the second member feature 146 permits limited rotational motion of the first member 142 relative to the second member 150.

Preferably, as shown in FIG. 2, the output member 132 is in the form of a cylinder having a generally circular cross section. The output member 132 has an output member diameter OMD. It should be appreciated that the dimensions of the components composing the clutch 112 must be chosen to provide a clutch 112 with sufficient strength to translate the torque required through the clutch 112. The dimensions of the components of the clutch 112 may vary based upon the composition and strength of the components of the clutch 112.

For example, the output member diameter OMD may have a diameter of approximately 10 mm. The first member feature 144 may protrude beyond the outer periphery 152 of the output member 132.

The first member feature 144 thus may be in the form of a protrusion or dog extending outwardly from the periphery 152 of first member feature 142. The dog 144 may have any suitable shape but, to provide for ample contact surface with second member feature 146 of the second member 150, preferably, the dog 144 has a truncated pie shape defined by an arcuate outer periphery 154 and radial extending walls 156. The arcuate periphery 154 may be defined by radius RFD. The radius RFD may be approximately 13 mm. The radially extending walls 156 of the first member dog 144 may be spaced apart sufficient to obtain enough strength in the dog 144. For example, the radial walls 156 may define an angle α therebetween. The value of angle α may be 35 degrees.

The first member 142 may be made of any durable suitable material. For example, the first member 142 may be made of a plastic, e.g. a Delrin material. Preferably, the first member 142 may be made with a Delrin material including p-polytetrafluoroethylene filler. The PTFE material improves the lubricity and ability of the material to rotate relative to the second member 150.

Figure 3:
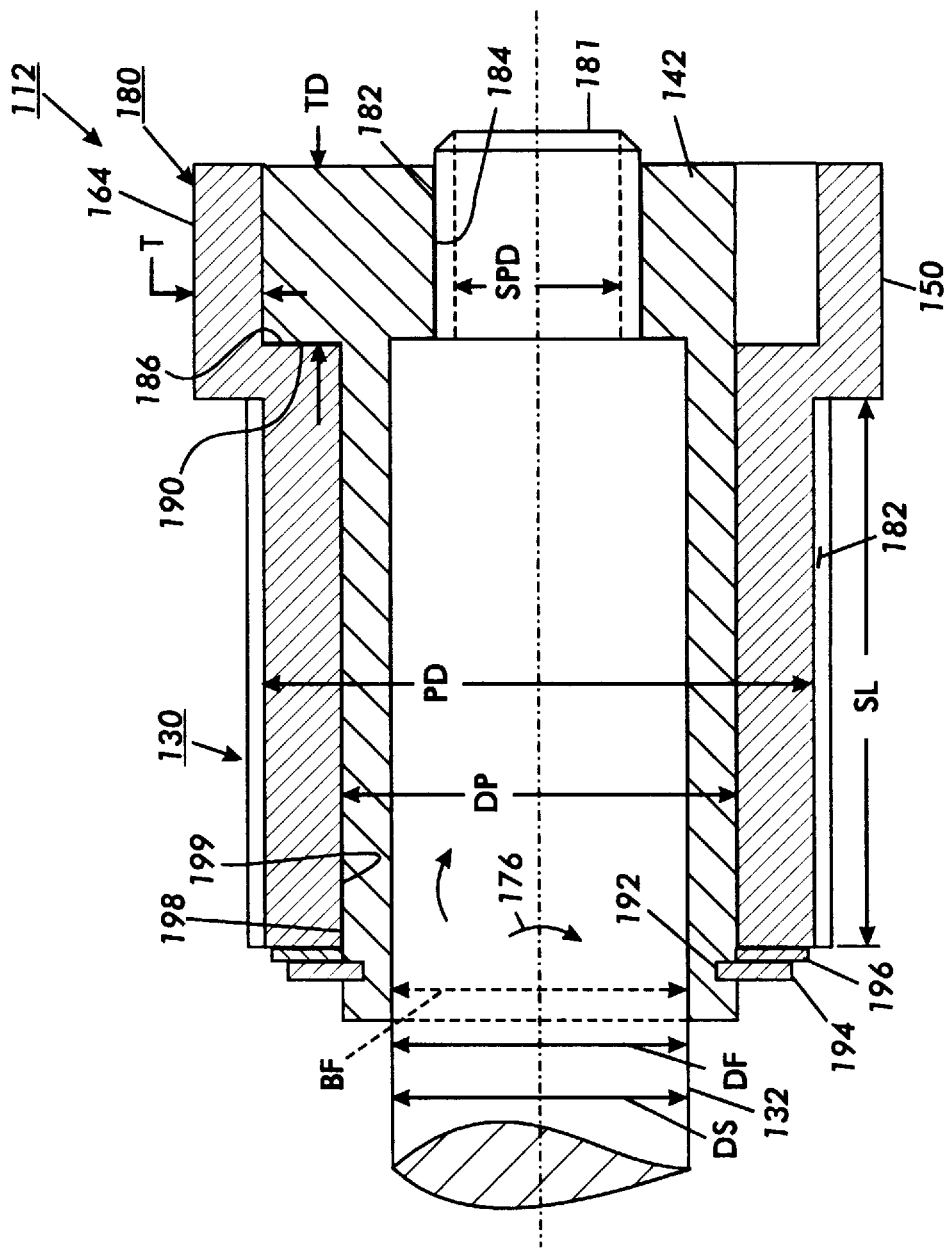
FIG. 3 is a sectional view of the limited rotation slip clutch of FIG. 2 along the line 3—3 in the direction of the arrows showing in the clutch in greater detail.

As shown in FIGS. 2 and 3, the second member 150 is preferably in the shape of a hollow cylinder or tube with at least a portion of the second member 150 surrounding a portion of the first member 142. For simplicity, the second member feature 146 is similar in shape and, for sufficient torque transfer, has a shape and size substantially similar to the first member of the dog 144. Thus, the second member feature 146 is likewise in the form of a protrusion or dog. The second member dog 146 extends inwardly from inner periphery 160 of the second member 150. The second member 150 includes a cylindrical tube shaped portion 162 defined by a thickness TS between the inner periphery 160 and outer periphery 164 of the second member 150. The tubular portion 162 has a thickness TS of, for example, approximately 3 mm.

The second member dog 146 preferably extends inwardly from inner periphery 160 of tube portion 162 of second member 150. The second member dog 146 extends inwardly to inner periphery 166 defined by radius SMD of approximately 8 mm. The second member dog 146 is further defined by radially extending walls 170 define an angle β therebetween. The angle β may be, for example, 35 degrees.

The first member dog and second member dog 144 and 146 may have a thickness TD sufficient to provide ample strength to transmit the torque through the clutch 112. For example, the dogs 144 and 146 may have a thickness TD of approximately 10 mm as shown in FIG. 3.

The second member 150 may be made of any durable suitable material, e.g. a metal or a plastic material. Similar to first member 142, second member 150 may be made of a plastic, e.g. a Delrin material. The Delrin material may preferably include PTFE (polytetrafluoroethylene) filler. The second member 150 may alternately be made of a powdered metal.

The second member 150 is operatively connected to an input member for transmitting torque to the second member 150. Referring to FIGS. 2 and 3, the input member may be in the form of the timing belt 126.

Referring again to FIG. 1, as the motor 106 causes drive sprocket 124 to rotate in the direction of arrow 172, the timing belt 126 advances in the direction of arrow 174. Consequently, the timing belt 126 causes the driven sprocket 130 to rotate in the direction of arrow 176.

Referring again to FIG. 2, the motion of the timing belt 126 in the direction of arrow 174 drives the second member 150 in the direction of arrow 176. As the wall 170 of second member dog 146 contacts wall 156 of first member dog 144, the second member 150 causes the first member 142 to rotate in the direction of arrow 178, Referring now to FIG. 3, the coupling 112 is shown in greater detail. While it should be appreciated that the coupling 112 may operate as a separate component in the drive train to drive a feed assembly, for simplicity and to reduce costs, the coupling 112 as shown in FIG. 3 is integral with driven sprocket 130. The clutch 112 thus preferably as shown in FIG. 3, includes a clutch portion 180 which is shown in cross section in FIG. 2 as well as sprocket portion 130.

It should be appreciated that the clutch portion 180 and the sprocket portion 130 of the coupling 112 may be coincident with sprocket teeth being positioned on outer periphery 164 of clutch portion 180. While such a design may be less expensive and complicated than that shown in FIGS. 2 and 3, the implementation as shown in FIGS. 2 and 3 with the sprocket portion 130 separate from the clutch portion 180 permits the dimensions of the clutch portion 180 to be independent of the size of the sprocket 130. Thus, optimum clutch components sizes may be selected independent of the proper rotational speed which is controlled by the sprocket 130.

The sprocket portion 130 may include external gear teeth to mate with the remainder of a gear train, may include V or other types of belts, or as shown in FIG. 3, may include timing sprocket teeth 182. The timing sprocket teeth 182 may have any suitable size and shape. For example, the teeth 182 may have a pitch of 3 mm and be in the form of HTD teeth. The sprocket 130 may have a pitch diameter PD of say approximately 23 mm. For such a size sprocket diameter, the sprocket 130 would include 24 teeth with a pitch of 3 mm. The sprocket portion 130 may have a length SL of say approximately 15–20 mm.

The shaft 132 may be secured to first member 142 in any suitable fashion, e.g., by a press fit or by gluing. For example, as shown in FIG. 3, the shaft 132 may be connected to first member 142 by a threaded portion of shaft 132 with external threads 182 mating with internal threads 184 on the first member 142. The threads 182 on shaft 132 may have a pitch diameter SPD of 8 mm. The threads 182 and 184 may be metric M6 threads.

The second member 150 is rotatably secured to first member 142 by any suitable method. For example, as shown in FIG. 3, the second member 150 includes an inner shoulder 186 against which inner face 190 of first member dog 144 (see FIG. 2) is restrained. Referring again to FIG. 3, to further restrain the second member 150 with respect to the first member 142 in the axial direction, the first member 142 may include a groove 192 into which a retaining ring 194 may be fitted. A thrust washer 196 may by positioned between the retaining ring 194 and the second member 150 to provide for suitable wear characteristics and thrust capacity.

To permit relative motion between the first member 142 and the second member 150, the first member 142 includes a cylindrical journal 198 which is matingly fitted with bore 199 of the second member 150. For example, the journal 198 and bore 199 may have a diameter DP of approximately 16 mm. The shaft 132 may have a diameter DS which is fitted to bore BF of first member 142. The diameter DS and BF may be approximately 10 mm.

It should be appreciated that the retaining ring 194 and groove 192 may be replaced by a bearing (not shown) secured to shaft 132 with the shoulder of the bearing restraining the second member 150 in an axial direction.

The threads 182 and 184 are preferably either right or left hand threads depending upon the relative rotation of the first and second members 142 and 150 such that the first member 142 is urged toward shaft 132 such that the threads serve to be self locking. Optionally, a lock nut may also be used to secure the members 142 and 150.

Referring again to FIG. 1, the drive sprocket 130 causes the shaft 132 to rotate in the direction of arrow 176. The paper feed rolls 114 similarly rotate in the direction of arrow 176 causing sheet 99 to translate through paper nip 122 in the direction outward from the paper (see FIG. 1).

Referring again to FIG. 5, the sheet 99 advances from print module output paper feed assembly 102 to feed module input paper feed assembly 104. The finishing module input paper feed assembly 104 tends to cause the sheet 99 to be pulled in the direction of arrow 103. Thus, the input paper feed assembly 104 pulls or overcomes the output paper feed assembly 102. The one way clutch of the present invention permits the sheet 99 to be accelerated from the output paper feed assembly 102 to the input paper feed assembly 104.

Referring again to FIG. 1, the sheet 99 is accelerated in a direction outward from the paper at the paper nip 122 causing the shaft 132 to accelerate in the direction of arrow 178.

Referring again to FIG. 2, as the first member 142 accelerates in the direction of arrow 176 pulled by input paper feeder 104, first member dog 144 separates or advances from second member dog 146. Radial wall 156 of first dog 144 and radial wall 170 of second dog 146 thus define an occluded angle θ therebetween. The angle θ increases as the first member 142 accelerates in the direction of arrow 178 until the first dog 144 again contacts the second dog 146 on the opposite face. The allowed value of the angle θ in degrees is thus 360 degrees minus the included angle of the first and second drive dogs 144 and 146. This relationship can be described by the formula:

$$\theta = 360 - \alpha - \beta$$

where:

α=included angle of the first drive dog in degrees

β=included angle of the second drive dog in degrees

The first member thus rotates at an angular velocity $W_2$ which is greater than the angular velocity $W_1$ of the second member 50. The value θ thus increases as the sheet 99 is within the nip 122.

Figure 6:
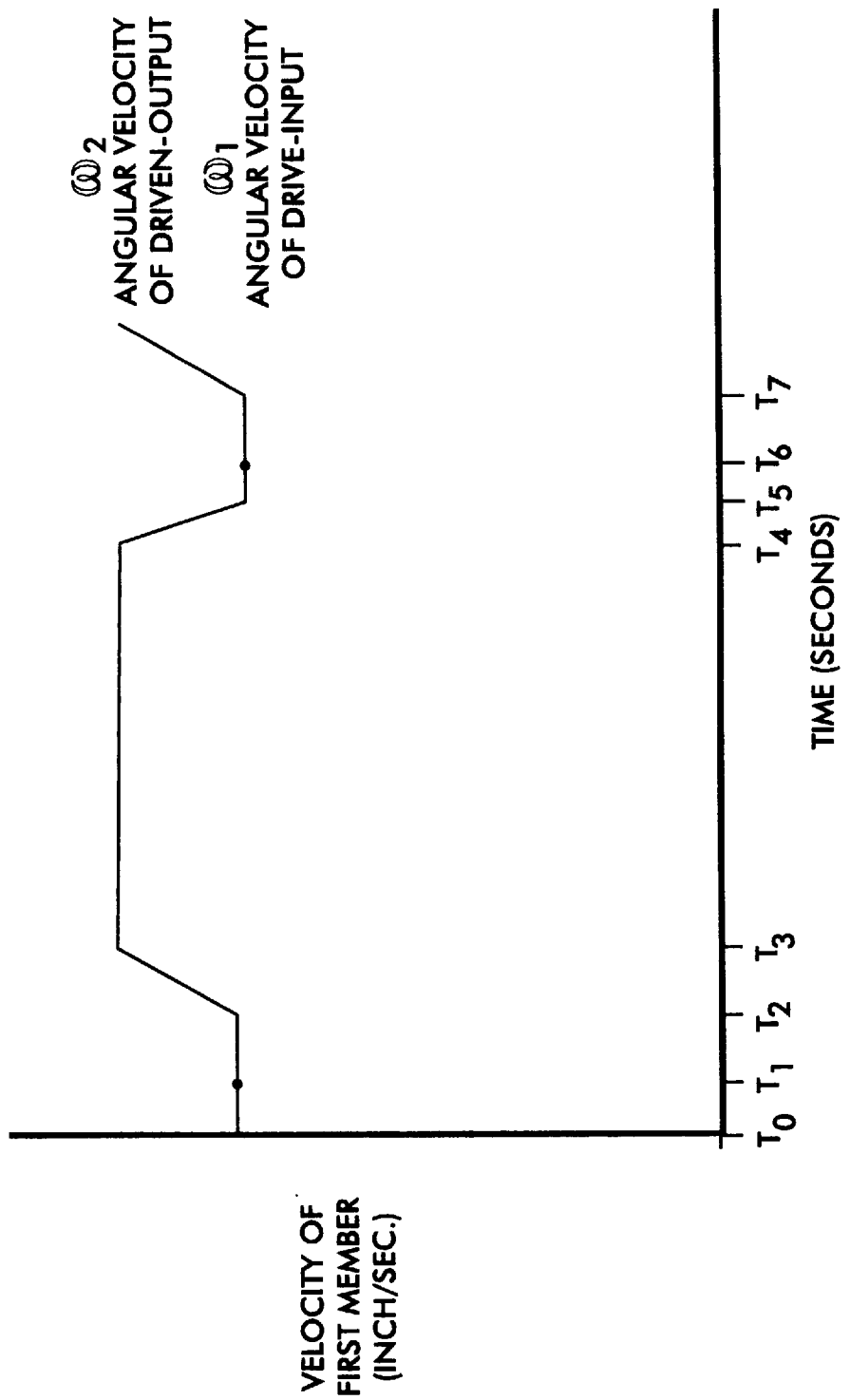
FIG. 6 is a plot of a limited slip clutch first member velocity with respect to time for the clutch of FIG. 1.

Referring now to FIG. 6, the velocity of the first member 142 is shown as it changes over time. At time $T_0$, the first member 142 is being driven by the second member 150 and the first member 142 and second member 150 are rotating at an angular velocity $\omega_1$ with no sheet located within the paper nip 122. At time $T_1$, the sheet 99 enters the nip 122. The leading edge of the sheet 122 further advances from time $T_1$ to time $T_2$ to the input paper feed assembly 104. At time $T_2$, the input paper feed assembly causes the sheet 99 to accelerate causing the first member 142 to accelerate to an angular velocity of $\omega_2$ at time $T_3$ shortly after time $T_2$. At time $T_4$, the first sheet exits the nip 122. At a time $T_5$ subsequent to time $T_4$ the first member 142 rapidly decelerates to an angular velocity $\omega_1$. At time $T_6$, the second sheet enters the nip 122. At a time $T_7$, the second sheet enters the input paper feed assembly 104 and the velocity of the first member 142 rapidly accelerates again to second angular velocity $\omega_2$.

Figure 7:
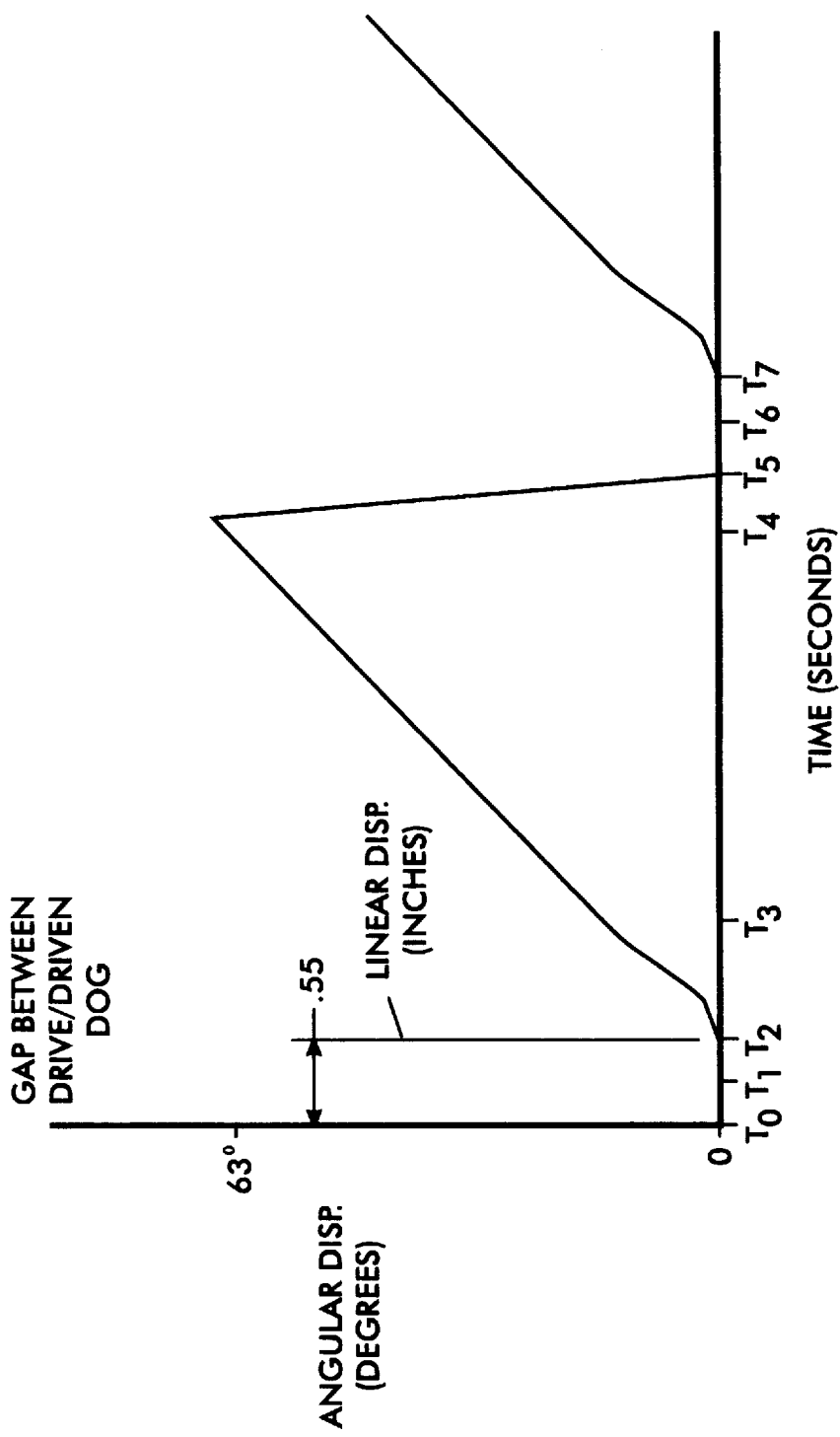
FIG. 7 is a plot of a limited slip clutch first member displacement with respect to time for the clutch of FIG. 1.

Referring now to FIG. 7, the gap between first member dog 144 and second member dog 146 is shown in relationship to time. At time $T_0$, a sheet is not positioned within the paper nip 122 and second member 150 causes first member 142 to rotate at the same rotational speed with the gap θ between the drive dogs 144 and 146 being zero. At time $T_1$, the leading edge of the first sheet enters nip 122. The first and second member 142 and 150 continue to rotate together and the gap θ between the first and second drive dogs 144 and 146 remain at zero. At time $T_2$, the leading edge of the first sheet enters the input paper feed assembly 104 and the differential speed of the input paper feed assembly causes the first member 142 to rotate at a higher speed than the second member 150 causing the first drive dog 144 to separate from the second drive dog 146. The gap θ thus increases while the sheet advances from the paper nip 122 toward input feed assembly 104. At time $T_4$, the trailing edge of the paper exits paper nip 122 and the first member 142 decelerates, closing the gap by time $T_5$. At time $T_6$, a second sheet enters the nip 122 and the second drive dog 142 drives the first drive dog 144 keeping the gap θ at zero until time $T_7$ when the leading edge of the second sheet enters input paper feed assembly 104 and begins to cause the first member 142 to separate from the second member 150.

For a printing machine having a capacity of 100 cpm and copying sheets with a size of 11×17 inches, and considering interdocument gap to be approximately three inches, a pitch of 14 inches is provided. With a pitch of 14 inches and 80 cpm, the linear speed of the sheets can be defined by the formula:

$$LS = P \times CPM$$

where:

P=pitch in inches

CPM=copies per minute

LS=linear speed in inches per minute

For a printing machine with a set of feed rolls with a diameter of approximately one inch, the rotational speed of the feed rolls may be defined by the formula:

$$R = LS/(\pi \times D)$$

where:

LS=linear speed in inches/minute

D=diameter of feed roll in inches

R=speed in revolutions per minute

For a translational speed of 1120 inches per minute, the rotational speed of the drive rolls is approximately 356.5 revolutions per minute. At 356.5 revolutions per minute, a revolution occurs every 0.168 seconds.

Applicant has found that simple inexpensive AC non-synchronous motors may have an error of 5 percent or less.

For a feed roll utilizing the one way clutch of the present invention, the slip allowed within the nip may be defined by the formula:

$$S = D\theta/2$$

where:

D=diameter of feed roll in inches

θ=allowed angle of rotation of drive dog to driven dog in radians=360−α−β (see page 19)

S=slip in inches

The required linear slip may be defined by the formula:

$$RS = (SL - L) \times PE$$

where:

RS=required slip in inches

SL=sheet length in inches

L=distance between adjacent nips in inches

PE=error in decimal form

The time for the first and second dog members to re-contact is defined by the formula:

$$T = RS/S_1$$

where:

$S_1$=speed of sheet in first module in inches per minute

RS=required slip in inches

The above formula assumes no coast. It should be appreciated that time will increase with coast.

Using the above formulas and assuming L=6 inches, SL=11 inches, PE=0.05, and $S_1$=1120 inches/minute, the required slip (RS) is 0.25 inches, or about 28.6 degrees of dog rotation.

Referring again to FIG. 7, for 80 cpm with a 14 inch pitch, a displacement of 0.25 inches accumulates during the time that the sheet is in both nips. This is based on the process speed being the same as the paper path speed. It should be appreciated that often the paper path is faster, usually twice as fast, as the process speed. An interdocument gap of three inches permits the second member to recontact the first member within as much as 161 milliseconds. Applicant has found that with a minor drag, the deceleration can occur in much less than the 161 milliseconds permitted.

Figure 4:
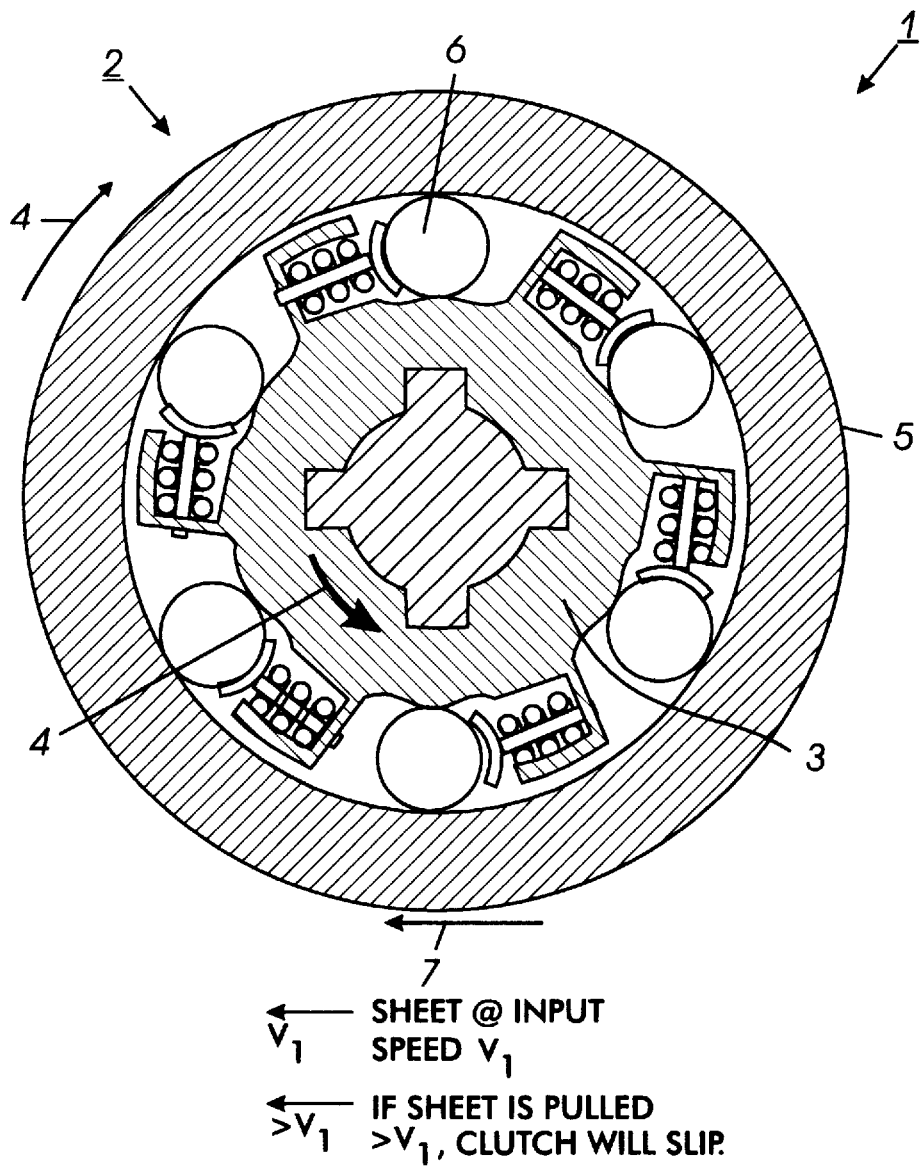
FIG. 4 is an elevational view of a prior art overdriving clutch.
Figure 8:
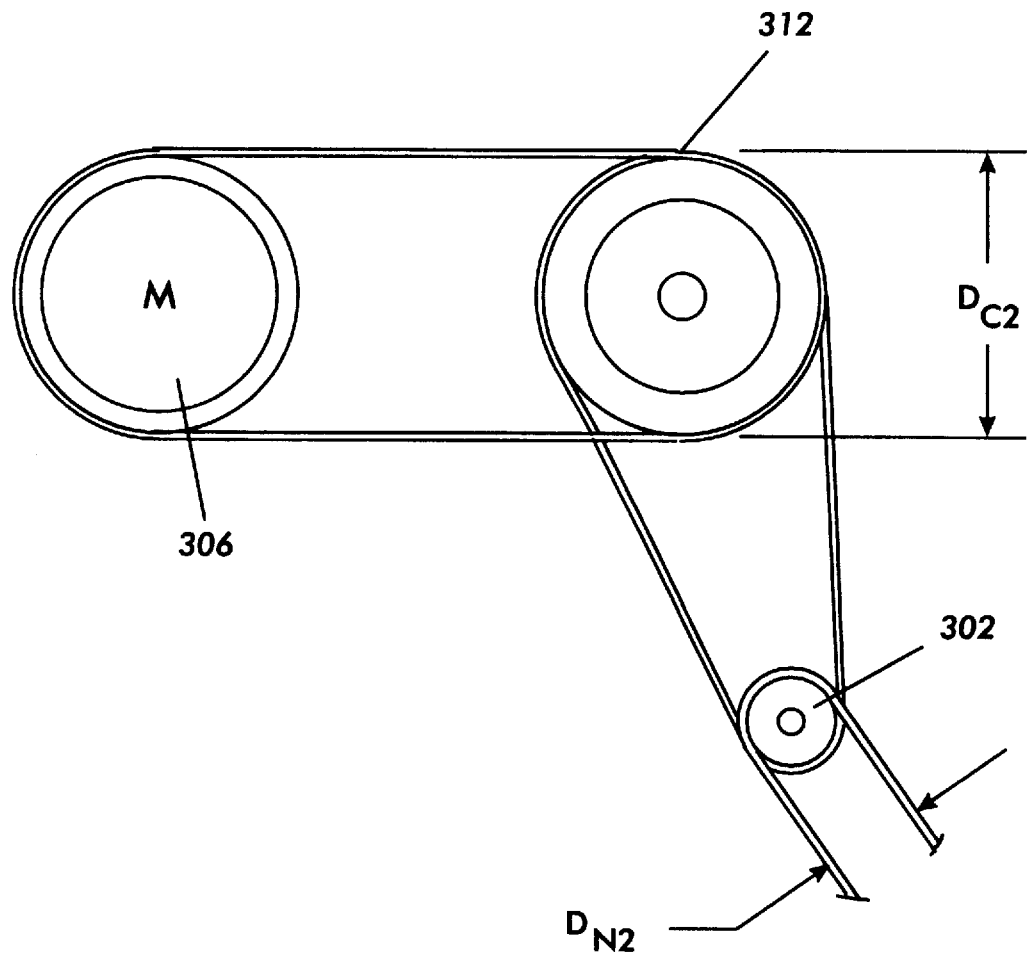
FIG. 8 is a schematic elevational view of a jackshaft incorporating the limited rotation slip clutch of FIG. 1.

Referring now to FIG. 8, an alternate embodiment of the present invention is shown with a clutch 312 positioned between motor 306 and paper feed assembly 302. The clutch 312 is shown on a jack shaft between the motor 306 and the feed assembly 302 such that the clutch 312 may have a diameter $D_{C2}$ much larger than the diameter $D_{N2}$ of the feed assembly 302 such that the allowed slip of, for example, 290 degrees may represent an allowed slip of 290 degrees times $D_{C2}$ over $D_{N2}$. Thus, if, for example, diameter $D_{C2}$ is five times the diameter of $D_{N2}$, the allowed slip may be 290 degrees times 5 or 1450 degrees. Thus, it should be appreciated that by utilizing a jack shaft as shown in FIG. 8, the clutch 312 may be utilized to permit a speed differential of the sheets of 5 times greater than that permitted by the clutch 112 of FIGS. 2–4.

Referring again to FIG. 5, it should be appreciated that the clutch 312 may be utilized to permit the sheet 99 to be accelerated from drive rolls 220 to drive rolls 230. The drive rolls 230 are used to accelerate the sheet 99 such that additional time may be had in the interdocument gap to provide for sorting of the sheets within the print module and within the finishing module 8. The clutch 312 would be utilized with feed rolls 220 to permit feed rolls 230 to accelerate the sheets 99.

It should further be appreciated that continuing to refer to FIG. 5, the clutches 112 or 312 may be utilized within duplexing, e.g., duplexing path 17 within feed rolls 240 to permit the sheet 99 to be moved in a direction opposed to the direction that the sheets operate during the xerographic process to permit jams to be cleared from the machine.

By providing a bushing with a protrusion that cooperates with a tab, sheet acceleration, jam clearance, and speed mismatches between adjacent modules may be accommodated.

By providing a one-way clutch in which relative motion can occur between a first member and a second member, a simple inexpensive clutch may be provided which is made from components with loose tolerances and molded parts.

By providing a clutch with a first member and a second member having relative motions, a clutch may be provided with components requiring no tight tolerances and that are not sensitive to contamination.

By providing a clutch with components with relative motions and a corresponding drive dog on each of the rotating parts, a simple inexpensive and reliable one way clutch may be provided.

It is, therefore, evident that there has been provided, in accordance with the present invention, an electrostatographic copying apparatus that fully satisfies the aims and advantages of the invention as hereinabove set forth. While the invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A coupling for mechanically interconnecting a rotating mechanism to a media advancing surface, for advancing media in a printing apparatus, the coupling comprising:
    a first member having a first member feature, said first member feature including a first protrusion extending outwardly from said first member; and
    a second member rotatably cooperating with said first member, said second member having a second member feature, said first member feature and said second member feature cooperating to provide limited rotation motion of said first member relative to said second member, wherein at least a portion of said first member is located within said second member, said second member feature including a second protrusion extending inwardly from said second member.

2. The coupling of claim 1, wherein the rotational motion of said first member relative to said second member is defined by an angle of less than 360 degrees.

3. The coupling of claim 1, wherein the rotational motion of said first member relative to said second member is defined by an angle of greater than 5 degrees.

4. The coupling of claim 1, wherein:
    said first member comprises a shaft; and
    said second member comprises a tube.

5. The coupling of claim 1, wherein said first member is connected to the rotating mechanism.

6. A coupling for mechanically interconnecting a rotating mechanism to a media advancing surface, for advancing media in a printing apparatus, the coupling comprising:
    a first member having a first member feature; and
    a second member rotatably cooperating with said first member, said second member having a second member feature, said first member feature and said second member feature cooperating to provide limited rotation motion of said first member relative to said second member, said second member defining a cylindrical outer periphery thereof, at least a portion of said outer periphery defining the media advancing surface.

7. The coupling of claim 6, wherein the rotational motion of said first member relative to said second member is defined by an angle of less than 360 degrees.

8. The coupling of claim 6, wherein the rotational motion of said first member relative to said second member is defined by an angle of greater than 5 degrees.

9. The coupling of claim 6, wherein:
    said first member comprises a shaft; and
    said second member comprises a tube.

10. The coupling of claim 6, wherein said first member is connected to the rotating mechanism.

11. A printing apparatus, including a coupling for mechanically interconnecting a rotating mechanism to a media advancing surface, for advancing media, the coupling comprising:
    a first member having a first member feature, said first member feature including a first protrusion extending outwardly from said first member; and
    a second member rotatably cooperating with said first member, said second member having a second member feature, said first member feature and said second member feature cooperating to provide limited rotation motion of said first member relative to said second member, said second member feature including a second protrusion extending inwardly from said second member.

12. The printing machine of claim 11, wherein the rotational motion of said first member relative to said second member is defined by an angle of less than 360 degrees.

13. The printing machine of claim 11, wherein the rotational motion of said first member relative to said second member is defined by an angle of greater than 5 degrees.

14. The printing machine of claim 11, wherein:
    said first member comprises a shaft; and
    said second member comprises a tube.

15. The printing machine of claim 11, wherein said first member is connected to the rotating mechanism.

16. A printing apparatus, including a coupling for mechanically interconnecting a rotating mechanism to a media advancing surface, for advancing media, the coupling comprising:
    a first member having a first member feature; and
    a second member rotatably cooperating with said first member, said second member having a second member feature, said first member feature and said second member feature cooperating to provide limited rotation motion of said first member relative to said second member, said second member defining a cylindrical outer periphery thereof, at least a portion of said outer periphery defining the media advancing surface.

17. The printing machine of claim 16, wherein the rotational motion of said first member relative to said second member is defined by an angle of less than 360 degrees.

18. The printing machine of claim 16, wherein the rotational motion of said first member relative to said second member is defined by an angle of greater than 5 degrees.

19. The printing machine of claim 16, wherein:
    said first member comprises a shaft; and
    said second member comprises a tube.

20. The printing machine of claim 16, wherein said first member is connected to the rotating mechanism.

* * * * *